(12) United States Patent
Gorodisher et al.

(10) Patent No.: US 11,993,004 B2
(45) Date of Patent: May 28, 2024

(54) MOLDING PROCESS AND COMPOSITIONS THEREFOR

(71) Applicant: 3M INNOVATIVE PROPERTIES COMPANY, St. Paul, MN (US)

(72) Inventors: Ilya Gorodisher, Stillwater, MN (US); Gregory P. Sorenson, Maplewood, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 248 days.

(21) Appl. No.: 17/641,289

(22) PCT Filed: Sep. 24, 2020

(86) PCT No.: PCT/IB2020/058944
§ 371 (c)(1),
(2) Date: Mar. 8, 2022

(87) PCT Pub. No.: WO2021/059189
PCT Pub. Date: Apr. 1, 2021

(65) Prior Publication Data
US 2022/0332042 A1 Oct. 20, 2022

Related U.S. Application Data

(60) Provisional application No. 62/983,318, filed on Feb. 28, 2020, provisional application No. 62/907,211, filed on Sep. 27, 2019.

(51) Int. Cl.
*B29C 64/124* (2017.01)
*B29K 105/00* (2006.01)
(Continued)

(52) U.S. Cl.
CPC ............ *B29C 64/124* (2017.08); *B33Y 10/00* (2014.12); *B33Y 70/00* (2014.12); *B33Y 80/00* (2014.12);
(Continued)

(58) Field of Classification Search
CPC .............. B29C 64/124; B29K 2049/00; B29K 2105/0002; B29L 2031/757; B33Y 10/00;
(Continued)

(56) References Cited

U.S. PATENT DOCUMENTS 2,756,251 A  7/1956  Joyner
2,912,454 A  11/1959  McKeever
(Continued)

FOREIGN PATENT DOCUMENTS

BE  818176  1/1975
CN  103980397  8/2014
(Continued)

OTHER PUBLICATIONS

Duffy, "Radical Polymerization of Alkyl 2-Cyanoacrylates", Molecules, Feb. 2018, vol. 23, No. 2, 21 pages.
(Continued)

*Primary Examiner* — Emmanuel S Luk
*Assistant Examiner* — Victoria Bartlett
(74) *Attorney, Agent, or Firm* — Bradford B. Wright

(57) ABSTRACT

A composition comprises a cyanoacrylate polymer and a protected amine. A method comprises: providing a shaped model comprising a cyanoacrylate polymer; preparing an investment having a cavity that corresponds to the shaped model; and heating the shaped model to sufficient temperature that the cyanoacrylate polymer depolymerizes and volatilizes. A hardenable material may be cast in the investment to provide a replica of the shaped model. A curable composition comprises: a cyanoacrylate monomer; a free-
(Continued)

radical photoinitiator; and a protected amine, wherein the curable composition is free of compounds that initiate anionic polymerization of the cyanoacrylate monomer at ambient temperature. A method of curing the curable composition is also disclosed.

2 Claims, 3 Drawing Sheets

(51) Int. Cl.
  *B29L 31/00* (2006.01)
  *B33Y 10/00* (2015.01)
  *B33Y 70/00* (2020.01)
  *B33Y 80/00* (2015.01)
(52) U.S. Cl.
  CPC .. *B29K 2049/00* (2013.01); *B29K 2105/0002* (2013.01); *B29L 2031/757* (2013.01)
(58) Field of Classification Search
  CPC ....... B33Y 70/00; B33Y 80/00; C08F 122/32; C08F 2/48; C08F 222/103; C08F 222/322; C08F 222/327; C08K 5/17; C08K 9/10; C08L 33/18
  See application file for complete search history.

(56) References Cited

U.S. PATENT DOCUMENTS

| | | |
|---|---|---|
| 2,926,188 A | 2/1960 | McKeever |
| 3,728,375 A | 4/1973 | Coover, Jr. |
| 3,880,790 A | 4/1975 | McLaren |
| 3,903,055 A | 9/1975 | Buck |
| 3,993,678 A | 11/1976 | Sweeny |
| 4,844,144 A | 7/1989 | Murphy |
| 5,391,460 A * | 2/1995 | Dougherty ............ G03F 7/0048 430/269 |
| 2005/0215744 A1 | 9/2005 | Wiese |
| 2006/0063870 A1 | 3/2006 | Chang |
| 2014/0170398 A1 | 6/2014 | Carlson |
| 2018/0371124 A1 * | 12/2018 | Woods .................. C08F 222/14 |
| 2022/0213245 A1 * | 7/2022 | Snow ........................ C08F 2/48 |

FOREIGN PATENT DOCUMENTS

| | | | | |
|---|---|---|---|---|
| CN | 108774376 A | * | 11/2018 | .......... B29C 64/124 |
| EP | 0393799 | | 10/1990 | |
| WO | WO 1997-043061 | | 11/1997 | |
| WO | WO 2008-016057 | | 2/2008 | |
| WO | WO 2017-151711 | | 9/2017 | |
| WO | WO 2018-111637 | | 6/2018 | |

OTHER PUBLICATIONS

Fink, "Reactive Polymers—Fundamentals and Applications—a Concise Guide to Industrial Polymers (Chapter 13: Cyanoacrylates)", 417-432, (2018).
Ho, "Lost Foam Casting of Periodic Cellular Materials With Aluminum and Magnesium Alloys", A thesis submitted in University of Toronto, 2009, 102 pages.
Ngo, "Additive Manufacturing (3D Printing): A review of materials, methods, applications and challenges", Composites Part B: Engineering, Jun. 2018, vol. 143, pp. 172-196.
Soemardi, "The Effect of Temperature Increase, Holding Time and Number of Layers on Ceramic Shells Using the Investment Casting Process", International Journal of Technology, 2016, vol. 7, No. 6, pp. 1035-1044.
International Search Report for PCT International Application No. PCT/IB2020/058944, dated Nov. 23, 2020, 5 pages.

* cited by examiner

MOLDING PROCESS AND COMPOSITIONS THEREFOR

CROSS-REFERENCE TO RELATED APPLICATIONS

This application is a national stage filing under 35 U.S.C. 371 of PCT/IB2020/058944, filed Sep. 24, 2020, which claims the benefit of U.S. Application No. 62/983,318, filed Feb. 28, 2020, and U.S. Application No. 62/907,211, filed Sep. 27, 2019.

TECHNICAL FIELD

The present disclosure broadly relates to cyanoacrylate compositions and methods of using them.

BACKGROUND

Although lost-wax or investment casting (IC) technology dates back several millennia to ancient Egypt and Mesopotamia, it is still widely employed to manufacture small artifacts in dental and jewelry industries. The IC process starts with the creation of a wax model which is then used to create a silicone mold (negative impression) around it. The two halves of the silicone mold can then be used to create additional wax models. Wax models are then attached to a wax stem with a sprue and a pre-ceramic investment shell is constructed around the assembly. After the investment shell hardens (commonly known as an investment), it is placed in the furnace to first melt out the wax, then to burn out the residuals. Molten metal is then cast into the cavity thus created by lost wax. After the metal solidifies and cools, the investment is shattered, and the resultant cast metal article is deburred and polished.

The term "additive manufacturing" refers to a process by which digital 3D design data is used to build up a component in layers by depositing material. The terms "3D printing" and "rapid prototyping" are also used as synonyms for additive manufacturing. Generally, additive manufacturing processes build up components layer by layer, e.g., using hardenable materials. Metal powders (e.g., laser-sintering, or binder jet fabrication), curable resins (e.g., stereolithography), and plastics (e.g., extrusion) have been used.

The strengths of additive manufacturing lie in those areas where conventional manufacturing reaches its limitations. For example, additive manufacturing allows for highly complex structures which can still be extremely light and stable. It also provides a high degree of design freedom, the optimization and integration of functional features, the manufacture of small batch sizes at reasonable unit costs and a high degree of product customization even in serial production.

However, for many items common in industry, manufacture by the lost-wax process can be impractical for many reasons. For small dental & jewelry applications, machined metal (e.g., aluminum or steel) molds are necessary to cast multiple wax models since flexible silicone molds do not provide sufficient heat transfer required to fabricate individual large wax pieces. Also, for large intricate structures, wax can lack sufficient mechanical integrity and suffer from thermal expansion mismatch with the investment material. In models of large articles, such thermal mismatch frequently leads to catastrophic failure of the investment during the burnout stage. Large wax models also become increasingly difficult to completely burnout from the investment.

A number of remedies have been attempted to mitigate thermal transfer issues, including 3D (i.e., three-dimensional) printing of wax models. But that process is slow because of the time required for deposited wax layers to solidify, and thermal mismatch and the burnout issues remain Industry has begun to look to 3D printing to generate polymer models using acrylates optimized for thermal expansion coefficients. However, even these polymer models still suffer from incomplete burnout issues.

SUMMARY

The present disclosure provides new compositions and methods that are useful for creating prototypes, models, molds, masters, and similar forms using additive manufacturing methods (e.g., stereolithography). In the method, a shaped model is fabricated using a cyanoacrylate-based composition according to the present disclosure. Then, an investment casting is made of it that has a correspondingly shaped cavity that contains the shaped model. Heating the investment/shaped model assembly above the depolymerization temperature of the cyanoacrylate polymer of the shaped model depolymerizes it into volatile monomer, which can then be recovered and recycled, leaving behind an investment (optionally after further heating) suitable for making a casting.

The present disclosure can be used for rapidly prototyping articles in additive manufacturing. It can be leveraged for additive manufacturing both the positive masters or models and negative molds for investment casting.

In one aspect, the present disclosure provides a composition comprising:

a cyanoacrylate polymer; and a protected amine.

In another aspect, the present disclosure provides a method comprising:

making a shaped model comprising a cyanoacrylate polymer;

preparing an investment that has a cavity corresponding to the shaped model;

heating the shaped model to sufficient temperature that the cyanoacrylate polymer depolymerizes and volatilizes.

In many embodiments, the method further comprises:

at least partially filling the investment with a hardenable fluid material;

hardening the hardenable fluid material to form a casting; and isolating the casting from the investment.

In yet another aspect, the present disclosure provides a curable composition comprising:

a cyanoacrylate monomer;

a free-radical photoinitiator; and a protected amine.

The curable composition can be exposed to sufficient actinic radiation to decomposed the free-radical photoinitiator and cause free-radical polymerization of at least a portion of the cyanoacrylate monomer.

As used herein:

The term "cyanoacrylate" refers to a monomer represented by

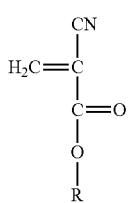

wherein each R independently represents an alkyl group having from 1 to 8 carbon atoms (e.g., methyl, ethyl, isopropyl, butyl, isobutyl, pentyl, neopentyl, cyclohexyl, hexyl, octyl, or isooctyl) or an alkoxyalkyl group having from 3 to 8 carbon atoms (e.g., methoxyethyl, ethoxy ethyl, 3-methoxypropyl, 2-methoxy-1-methylethyl, or butoxybutyl), an alkenyl group having 2 to 8 carbon atoms (e.g., vinyl, allyl, methallyl), an aryl group (e.g., phenyl), an aralkyl group (e.g., benzyl or phenethyl), or a haloalkyl group (e.g., 3-chloropropyl, 2-chlorobutyl, trifluoromethyl).

The term "cyanoacrylate polymer" refers to a polymer with a divalent backbone structure represented by

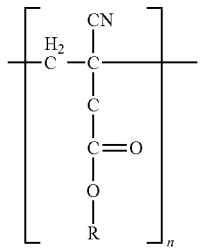

wherein each R independently represents an alkyl group having from 1 to 8 carbon atoms (e.g., methyl, ethyl, isopropyl, butyl, isobutyl, pentyl, neopentyl, cyclohexyl, hexyl, octyl, or isooctyl) or an alkoxyalkyl group having from 3 to 8 carbon atoms (e.g., methoxyethyl, ethoxy ethyl, 3-methoxypropyl, 2-methoxy-1-methylethyl, or butoxybutyl), an alkenyl group having 2 to 8 carbon atoms (e.g., vinyl, allyl, methallyl), an aryl group (e.g., phenyl), an aralkyl group (e.g., benzyl or phenethyl), or a haloalkyl group (e.g., 3-chloropropyl, 2-chlorobutyl, trifluoromethyl); and n represents an integer greater than 10.

The term "(meth)acrylate" refers to acrylate and/or (meth) acrylate.

The term "protected amine" refers to a material containing encapsulated amine and/or a chemically-blocked amine, incapable of spontaneously initiating the cyanoacrylate monomer at 20° C., that can be unblocked to generate an amine.

Features and advantages of the present disclosure will be further understood upon consideration of the detailed description as well as the appended claims.

Figure 1:
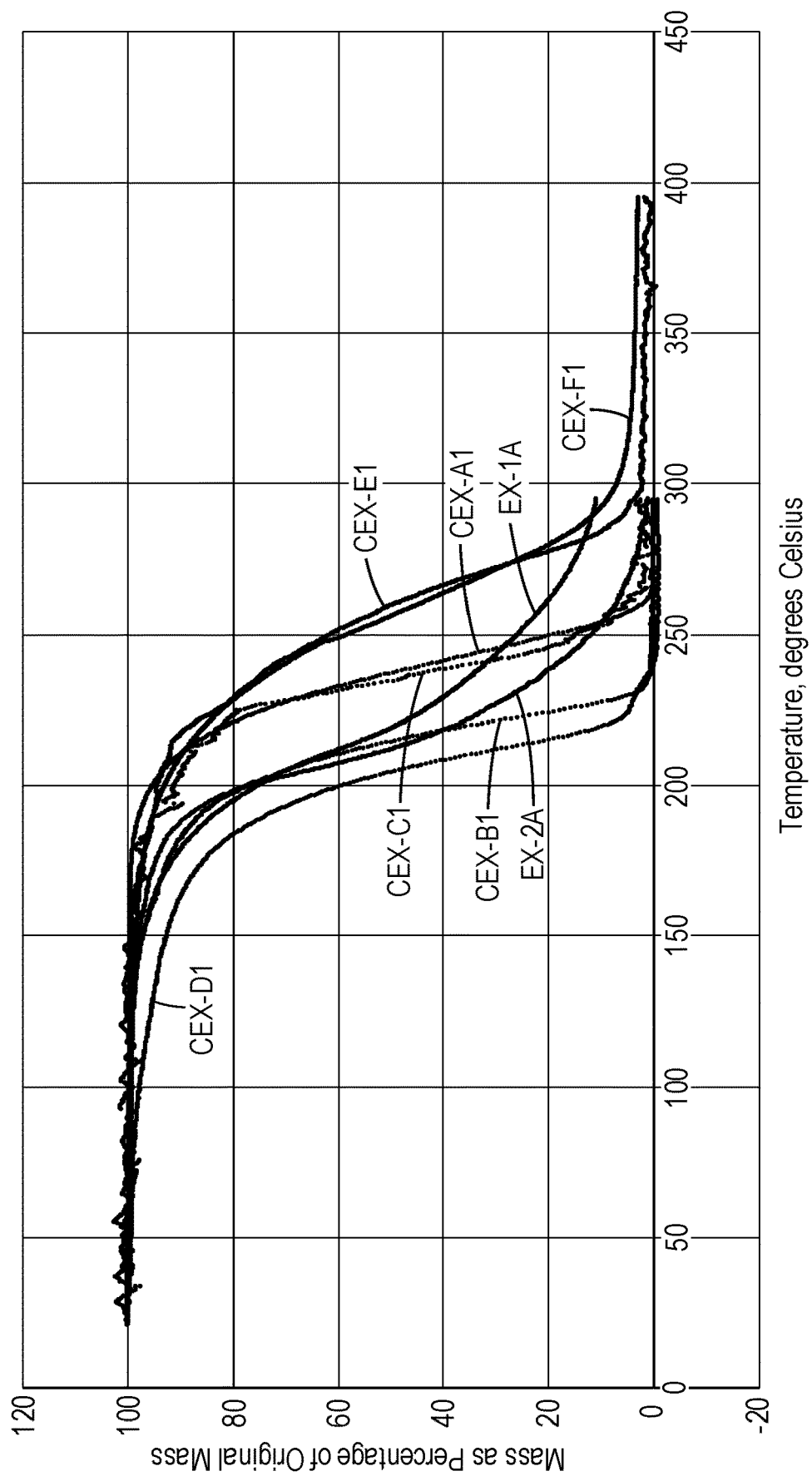
FIG. 1 is a plot of weight in percent vs. temperature in ° C. during Thermal Gravimetric Analysis (TGA) for Comparative Examples CEX-A1 through CEX-F1 and Examples EX-1A to EX-2A.

Repeated use of reference characters in the specification and drawings is intended to represent the same or analogous features or elements of the disclosure. It should be understood that numerous other modifications and embodiments can be devised by those skilled in the art, which fall within the scope and spirit of the principles of the disclosure. The figures may not be drawn to scale.

DETAILED DESCRIPTION

Compositions according to the present disclosure for use in making the shaped model include curable compositions that comprise at least one free-radically polymerizable cyanoacrylate monomer, at least one photoinitiator, and optionally, but preferably, at least one protected amine. The curable composition is generally free of compounds that initiate anionic polymerization of the cyanoacrylate monomer at 20° C.; however, minor amounts of such compounds may be acceptable if their effect is negligible.

Cyanoacrylate monomers are readily commercially available, or they can be prepared by known methods. Exemplary cyanoacrylate monomers include methyl cyanoacrylate, ethyl cyanoacrylate, n-butyl cyanoacrylate, isobutyl cyanoacrylate, 2-octyl cyanoacrylate, 2-methoxyethyl cyanoacrylate, 2-ethoxyethyl cyanoacrylate, and 2-methoxy-1-methylethyl cyanoacrylate.

The curable composition further comprises at least one photoinitiator. Typically, the at least one photoinitiator is present in an effective amount, although this is not a requirement. By the term "effective amount" is meant an amount that is at least sufficient amount to cause curing of the curable composition under ambient conditions. Typically, effective amounts of photoinitiator comprise less than 10 percent by weight, more typically less than 7 percent by weight, and more typically less than 3 percent by weight of the total curable composition. It will be recognized that curing may be complete even though polymerizable (meth) acrylate groups remain.

Exemplary photoinitiators include α-cleavage photoinitiators such as benzoin and its derivatives such as α-methylbenzoin; α-phenylbenzoin; α-allylbenzoin; α-benzylbenzoin; benzoin ethers such as benzil dimethyl ketal (available as IRGACURE 651 from Ciba Specialty Chemicals, Tarrytown, New York), benzoin methyl ether, benzoin ethyl ether, benzoin n-butyl ether; acetophenone and its derivatives such as 2-hydroxy-2-methyl-1-phenyl-1-propanone, and 1-hydroxycyclohexyl phenyl ketone. One useful photoinitiator, a difunctional α-hydroxyketone, is available as ESACURE ONE from IGM Resins, Waalwijk, The Netherlands. Other useful photoinitiators include: anthraquinones (e.g., anthraquinone, 2-ethylanthraquinone, 1-chloroanthraquinone, 1,4-dimethylanthraquinone, 1-methoxyanthraquinone) and benzophenone and its derivatives (e.g., phenoxybenzophenone, phenylbenzophenone).

The curable composition further comprises at least one protected amine that is unreactive toward the cyanoacrylate monomer(s) until desired. Protected amines may be physically and/or chemically protected amines. Examples of physically protected amines include amines that are encapsulated within a non-reactive shell that is free of cyanoacrylate-reactive groups (e.g., 1°, 2°, and 3° amines, water, thiols, and phosphines) that would render the curable composition unstable at 20° C.). Upon crushing and/or heating the contents of the shell are released and anionic polymerization of the cyanoacrylate is initiated. Exemplary suitable shell materials include starch, wax (synthetic and natural), ethyl cellulose, and polyvinyl alcohol. Suitable methods of encapsulating amines may include pan coating, centrifugal extrusion, and spray-drying.

Chemically protected amines that are those materials that can be thermolyzed or hydrolyzed to produce amines. These include, for example, secondary amides, carbamates, thiocarbamates and dithiocarbamates.

Examples of chemically protected amines include compounds represented by the formula

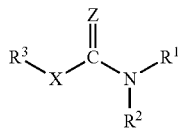

$R^1$, $R^2$, and $R^3$ independently represent H (except that at least one of $R^1$ and $R^2$ is not H), a hydrocarbyl group having 1 to 18 carbon atoms (preferably 1 to 14 carbon atoms, more preferably 1 to 10 carbon atoms), wherein optionally at least one secondary carbon atom is replaced by oxygen (e.g., an ether), except that $R^1$ and $R^2$ may taken together form an alkylene or alkylenoxyalkylene group having 2 to 8 carbon atoms (preferably 2 to 5 carbon atoms), and wherein at least one of $R^1$ and $R^2$ is not H.

Z represents O or S.

X represents O, S, or a direct bond (i.e., X is optional).

Exemplary chemically protected amines include carbamates that are derived from the reaction of isocyanates with secondary or tertiary alcohols such as tert-butyl N-phenyl-carbamate, 1,1-dimethylpropyl N-[4-[[4-(1,1-dimethyl-propoxycarbonylamino)phenyl]methyl]phenyl]carbamate, (1-methyl-1-phenyl-ethyl) N-[4-[[4-[(1-methyl-1-phenyl-ethoxy)carbonylamino]phenyl]methyl]phenyl]carbamate, and (1-methyl-1-phenyl-ethyl) N-[4-[[4-[(1-methyl-1-phenyl-ethoxy)carbonylamino]cyclohexyl]methyl]-cyclohexyl]carbamate.

The curable composition may optionally contain at least one anionic polymerization inhibitor (stabilizer) such as an acidic gas or a protonic or Lewis acid is normally added to the composition. Examples of acidic gases used for this purpose include sulfur dioxide, nitric oxide, carbon dioxide, hydrogen fluoride, etc. Known protonic acids include mineral acids such as hydrochloric or sulfuric acid, sulfonic acids, and carboxylic acids such as acetic, trichloroacetic, acrylic, methacrylic, and itaconic acid. Examples of anhydrides which are known anionic polymerization inhibitors are carboxylic acid anhydrides such as itaconic and maleic anhydride; phosphoric anhydrides such as phosphorus pentoxide; antimony pentoxide sultones; and acid chlorides. Anhydrides are particularly useful as they scavenge any water in the composition that might otherwise trigger cyanoacrylate anionic polymerization to yield 2 moles of Bronsted acid, which in turn is another inhibitor for the same. Anionic polymerization inhibitors which are Lewis acids include stannic chloride, ferric chloride, and boron trifluoride and its etherate complexes. These and other stabilizers are disclosed in U.S. Pat. No. 2,756,251 (Joyner et al.); U.S. Pat. No. 2,912,454 (McKeever et al.); U.S. Pat. No. 2,926,188 (McKeever et al.); U.S. Pat. No. 3,728,375 (Coover, Jr. et al.); and U.S. Pat. No. 3,993,678 (Sweeny et al.).

Curable compositions according to the present disclosure may contain an inhibitor against premature free-radical polymerization. Examples of such inhibitors are quinones, hydroquinones, p-methoxyphenol and sterically hindered, phenols, and phenothiazine. Appropriate amounts will be apparent to those of skill in the art.

Curable compositions according to the present disclosure may also contain thickeners as further auxiliaries. The thickeners used may be selected from many types of polymers including, for example, polymethyl methacrylate, other methacrylate copolymers, acrylate rubber, cellulose derivatives, or polyvinyl acetate. A typical quantity of thickener is generally about 20% by weight or less, based on the adhesive as a whole. In addition to or instead of the thickener, the cyanoacrylate adhesives according to the disclosure may also contain reinforcing additives. Examples of reinforcing additives include acrylic elastomers, acrylonitrile copolymers, elastomers, or fluororubbers. In addition, inorganic additives (e.g., large-surface silicates preferably coated with polydialkylsiloxanes, may be used).

The curable composition may be used to prepare a shaped model according to the present disclosure that comprises a cyanoacrylate polymer and a protected amine. In some cases, the shaped model may comprise a deprotected form of the amine, for example, before or during depolymerization of the cyanoacrylate polymer by heating. The shaped model may be solid throughout its body, but is preferably in the form of a hollow shell to minimize stress and cost. Shaped models may be constructed by any suitable means, including, for example, additive manufacturing (3D printing) methods such as stereolithography.

Stereolithography is an additive manufacturing process that, in its most common form, works by focusing a laser emitting actinic radiation (e.g., ultraviolet or visible light) onto a reservoir of photopolymerizable resin. With the help of computer aided manufacturing or computer-aided design (CAM/CAD) software, the UV laser is used to draw a pre-programmed design or shape on to the surface of the photopolymerizable resin. The photopolymerizable resins contains photosensitizer that absorbs the laser light and generates free-radicals, thereby initiating polymerization photopolymerizable resin to form a solid layer. Then, the build platform lowers one layer and a blade recoats the top of the tank with fresh photopolymerizable resin. This process is repeated for each layer of the design until the desired shaped model is complete. Completed molds are typically rinsed with solvent to remove unpolymerized resin off their surfaces.

It is also possible to print objects "bottom up" by using a reservoir with a transparent bottom and focusing the laser upward through the bottom of the reservoir. An inverted stereolithography machine starts a print by lowering the build platform to touch the bottom of the photopolymerizable resin-filled reservoir, then moving upward the height of one layer. The laser then writes the bottom-most layer of the desired part through the transparent reservoir bottom. Then, the reservoir is "rocked", flexing and peeling the bottom of the reservoir away from the hardened photopolymerized material; the hardened material detaches from the bottom of the reservoir and stays attached to the rising build platform, and new liquid photopolymerizable resin flows in from the edges of the partially built part. The laser then writes the second-from-bottom layer and repeats the process. An advantage of this bottom-up mode is that the build volume can be much bigger than the reservoir itself, and only enough photopolymer is needed to keep the bottom of the build reservoir continuously full of photopolymer. This approach is typical of desktop printers, while the right-side-up approach is more common in industrial systems.

Stereolithography typically requires the use of supporting structures which attach to the elevator platform to prevent deflection due to gravity, resist lateral pressure from the resin-filled blade, or retain newly created sections during the "reservoir rocking" of bottom up printing. Supports are typically created automatically during the preparation of Computer-Aided Design (CAD) models and can also be made manually. In either situation, the supports must be removed manually after printing.

Other forms of stereolithography without lasers use other light sources (e.g., lamps, flashlamps) to build each layer using masking using a computer-addressable liquid crystal display.

Once the shaped model is made it is used to prepare a mold, preferably ceramic, commonly known as an investment. The investment may be produced by repeating a series of steps including coating, stuccoing, and hardening until a desired thickness is achieved. Coating involves dipping a pattern cluster into a slurry of fine refractory material and then draining to create a uniform surface coating. Fine materials are used in this first step, also called a prime coat, to preserve fine details from the shaped model. Stuccoing applies coarse ceramic particles by dipping patterns into a fluidized bed, placing it in a rainfall-sander, or by applying materials by hand Hardening allows coatings to cure. These steps are repeated until the investment reaches its desired thickness, usually 5 to 15 mm. The Investments are left to dry completely, which can take 16 to 48 hours. Drying can be accelerated by applying a vacuum or minimizing environmental humidity. Investments can also be created by placing the pattern clusters into a flask and then pouring liquid investment material from above. The flask is then vibrated to allow entrapped air to escape and help the investment material fill any small voids. Exemplary refractory materials used to create the investments are silica, zircon, various aluminum silicates, and alumina Silica is usually used in the fused silica form. Aluminum silicates are a mixture of alumina and silica, where commonly used mixtures have an alumina content from 42 to 72 percent; at 72 percent alumina the compound is known as mullite. During the primary coat(s), zircon-based refractories are commonly used, because zirconium is less likely to react with molten metal. Prior to silica, a mixture of plaster and ground up old molds (chamotte) was used. The binders used to hold the refractory material in place include: ethyl silicate (alcohol-based and chemically set), colloidal silica (water-based, also known as silica sol, set by drying), sodium silicate, and a hybrid of these controlled for pH and viscosity.

Once the investment has sufficiently cured, the protected amine is typically converted to unprotected amine (e.g., by heating) unless this has already occurred (e.g., during curing of the investment) and the shaped model is removed by further heating. During heating, any amine that is present initiates a depolymerization process which regenerates the cyanoacrylate monomer. The cyanoacrylate monomer is volatilized, and optionally condensed and recycled. Temperatures sufficient to cause depolymerization are typically 200° C. or less, well below the ceiling temperature of most cyanoacrylate polymers.

Cyanoacrylate polymers in the presence of amines have relatively poor thermal stability, and start to degrade slightly above their $T_g$, which is significantly less than their ceiling temperature ($T_c$). The latter is the temperature at which the rates of polymerization and depolymerization are equal. Thermal behavior of isolated polymers, however, can be very complex, and degradative reactions other than depolymerization will often occur at temperatures below the $T_c$. Poly(ethyl 2-cyanoacrylate), for example, begins to degrade at around its $T_g$ of approximately 150° C., whereas its $T_c$ has been measured as 276° C. Rather than a random chain scission, thermal degradation occurs through a depolymerizing or "unzipping" mechanism that starts at the chain terminus, whereby the polymer chains undergo retro-polymerization to reform monomers.

Any remaining shaped model residue remaining at this point, if any, can be removed by higher temperature burnout at, e.g., between 870° C. and 1095° C., which also sinters the investment. Sometimes this heating is also used to preheat the mold before pouring, but other times the mold is allowed to cool so that it can be tested. Preheating allows the metal to stay liquid longer so that it can better fill all mold details and increase dimensional accuracy. If the mold is left to cool, any cracks found can be repaired with ceramic slurry or special cements.

The investment is then typically placed open-side up into a tub filled with sand, and a hardenable material (typically metal although this is not a requirement) is introduced into the mold, for example, by gravity pouring, or forcing by applying positive air pressure or other forces and allowed to cool. Vacuum casting, tilt casting, pressure assisted pouring and centrifugal casting are methods that use additional forces and are especially useful when molds contain thin sections that would be otherwise be difficult to fill.

Once the investment is filled with hardened material, the shell is hammered, media blasted, vibrated, water jetted, or chemically dissolved (sometimes with liquid nitrogen) to release the casting. The sprue is cut off and recycled. The casting may then be cleaned up to remove signs of the casting process, usually by grinding.

After cleaning, the completed casting is then subject to finishing. This usually goes further than grinding, with impurities and negatives being removed via hand tooling and welding. In the case that the part needs additional straightening, this process is usually carried out by hydraulic straightening presses, which bring the finished product in line with desired tolerances.

SELECT EMBODIMENTS OF THE PRESENT DISCLOSURE

In a first embodiment, the present disclosure provides a composition comprising:
 a cyanoacrylate polymer; and
 a protected amine.

In a second embodiment, the present disclosure provides a composition according to the first embodiment, wherein the cyanoacrylate polymer comprises a polymerization product of at least one of methyl cyanoacrylate, ethyl cyanoacrylate, n-butyl cyanoacrylate, isobutyl cyanoacrylate, 2-octyl cyanoacrylate, 2-methoxyethyl cyanoacrylate, 2-ethoxyethyl cyanoacrylate, or 2-methoxy-1-methylethyl cyanoacrylate.

In a third embodiment, the present disclosure provides a method comprising:
 making a shaped model comprising a cyanoacrylate polymer;
 preparing an investment that has a cavity corresponding to the shaped model;
 heating the shaped model to sufficient temperature that the cyanoacrylate polymer depolymerizes and volatilizes.

In a fourth embodiment, the present disclosure provides a method according to the third embodiment, wherein the cyanoacrylate polymer comprises a free-radical polymerization product of a corresponding cyanoacrylate monomer and a free-radical photoinitiator.

In a fifth embodiment, the present disclosure provides a method according to the third or fourth embodiment, wherein the shaped model further comprises at least one of an amine or a protected amine.

In a sixth embodiment, the present disclosure provides a method according to any one of the third to fifth embodiments, further comprising:
  at least partially filling the investment with a hardenable fluid material;
  hardening the hardenable fluid material to provide a casting; and
  isolating the casting from the investment.

In a seventh embodiment, the present disclosure provides a method according to any one of the third to sixth embodiments, wherein the shaped model is formed by an additive manufacturing process comprising successively curing superposed layers of a curable composition comprising: a cyanoacrylate monomer, a free-radical initiator, and a protected amine, wherein the curable composition is free of unprotected amine.

In an eighth embodiment, the present disclosure provides a method according to the seventh embodiment, wherein the additive manufacturing process comprises a stereolithographic process, and wherein the free-radical initiator comprises a free-radical photoinitiator.

In a ninth embodiment, the present disclosure provides a curable composition comprising:
  a cyanoacrylate monomer;
  a free-radical photoinitiator; and
  a protected amine.

In a tenth embodiment, the present disclosure provides a curable composition according to the ninth embodiment, wherein the cyanoacrylate monomer comprises at least one of methyl cyanoacrylate, ethyl cyanoacrylate, n-butyl cyanoacrylate, isobutyl cyanoacrylate, 2-octyl cyanoacrylate, 2-methoxyethyl cyanoacrylate, 2-ethoxyethyl cyanoacrylate, or 2-methoxy-1-methylethyl cyanoacrylate.

In an eleventh embodiment, the present disclosure provides a curable composition according to the ninth or tenth embodiment, wherein the protected amine comprises a chemically-blocked amine.

In a twelfth embodiment, the present disclosure provides a curable composition according to any of the ninth to eleventh embodiments, wherein the protected amine comprises an encapsulated amine.

In a thirteenth embodiment, the present disclosure provides a method of curing a curable composition according to any of the ninth to twelfth embodiments, the method comprising exposing the photoinitiator to sufficient actinic radiation to cause free-radical polymerization of at least a portion of the cyanoacrylate monomer.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Table 1, below, reports materials used in the Examples.

TABLE 1

| ABBRE-VIATION | DESCRIPTION |
| --- | --- |
| AM-1 | N,N-dimethylaniline from Sigma-Aldrich, Milwaukee, Wisconsin |
| AM-2 | tris(2,4,6-dimethylaminomethyl)phenol obtained as ANCAMINE K54 from Evonik GMBH, Marl, Germany |
| CA-1 | ethyl cyanoacrylate, obtained from 3M Company as 3M SCOTCH-WELD GENERAL PURPOSE INSTANT ADHESIVE EC5 CLEAR |
| CA-2 | methoxyethyl cyanoacrylate, obtained from 3M Company as 3M SCOTCH-WELD LOW ODOR INSTANT ADHESIVE LO1000 |
| IPA | isopropyl alcohol from Sigma-Aldrich |
| p-DHBQ | p-dihydrobenzoquinone from Sigma-Aldrich, Milwaukee, Wisconsin |
| MLQ | an approximately 1-to-1 weight mixture of 4,4'-diphenylmethane diisocyanate and 2,4'-diphenylmethane diisocyanate. Obtained as MONDUR MLQ from Covestro LLC, Pittsburgh, Pennsylvania. |
| 2-PP | 2-Phenyl-2-propanol, 98+%; CAS# 617-94-7; Obtained from Alfa Aesar, Tewksbury, Massachusetts. |
| PI1 | 2,2-dimethoxy-2-phenyl acetophenone, available as OMNIRAD 651 photoinitiator from IGM Resins, Waalwijk, The Netherlands |
| TEH | Tin(II) 2-ethylhexanoate, technical grade; CAS# 301-10-0; from Alfa Aesar. |
| TMPTA | trimethylolpropane triacrylate, available from Sigma-Aldrich Chemical Co. |
| PI2 | Lucirin TPO-L photoinitiator, 2,4,6-trimethylbenzoylphenyl phosphinate, from BASF Corp., Florham Park, New Jersey |
| YL-152-2 | starch-encapsulated AM-2, prepared generally according to methods described in PCT Pat. Publ. No. WO 2018/111637 (Ying et al.) |

Preparative Example 1

CA-1 (10 g) was vacuum distilled using a Kugelrohr short path distillation apparatus at 2 torr pressure and 90° C. Kugelrohr air temperature. The monomer was then stabilized by adding 0.1 g of p-DHBQ to the distillate.

Preparative Example 2

CA-2 (10 g) was vacuum distilled using Kugelrohr short path distillation apparatus at 2 torr pressure and 90° C. Kugelrohr air temperature. The monomer was then stabilized by adding 0.1 g of p-DHBQ to the distillate.

Preparative Example 3

A base solution was prepared by dissolving 0.12 g, (0.001 mol) of AM-1 in 7 g of isopropyl alcohol.

Comparative Example A

To a 0.5 g aliquot of distilled CA-1 from Preparative Example 1 were added 1 drop of base solution prepared in Preparative Example 3. Exothermic polymerization followed.

A 6.27 mg sample of the film was heated in a temperature ramp mode at 10° C./min to 300° C. in a TA-Instruments Q500 TGA thermal gravimetric analyzer. The resulting mass loss versus temperature trace (CEX-A1) is reported in FIG. 1.

Figure 2:
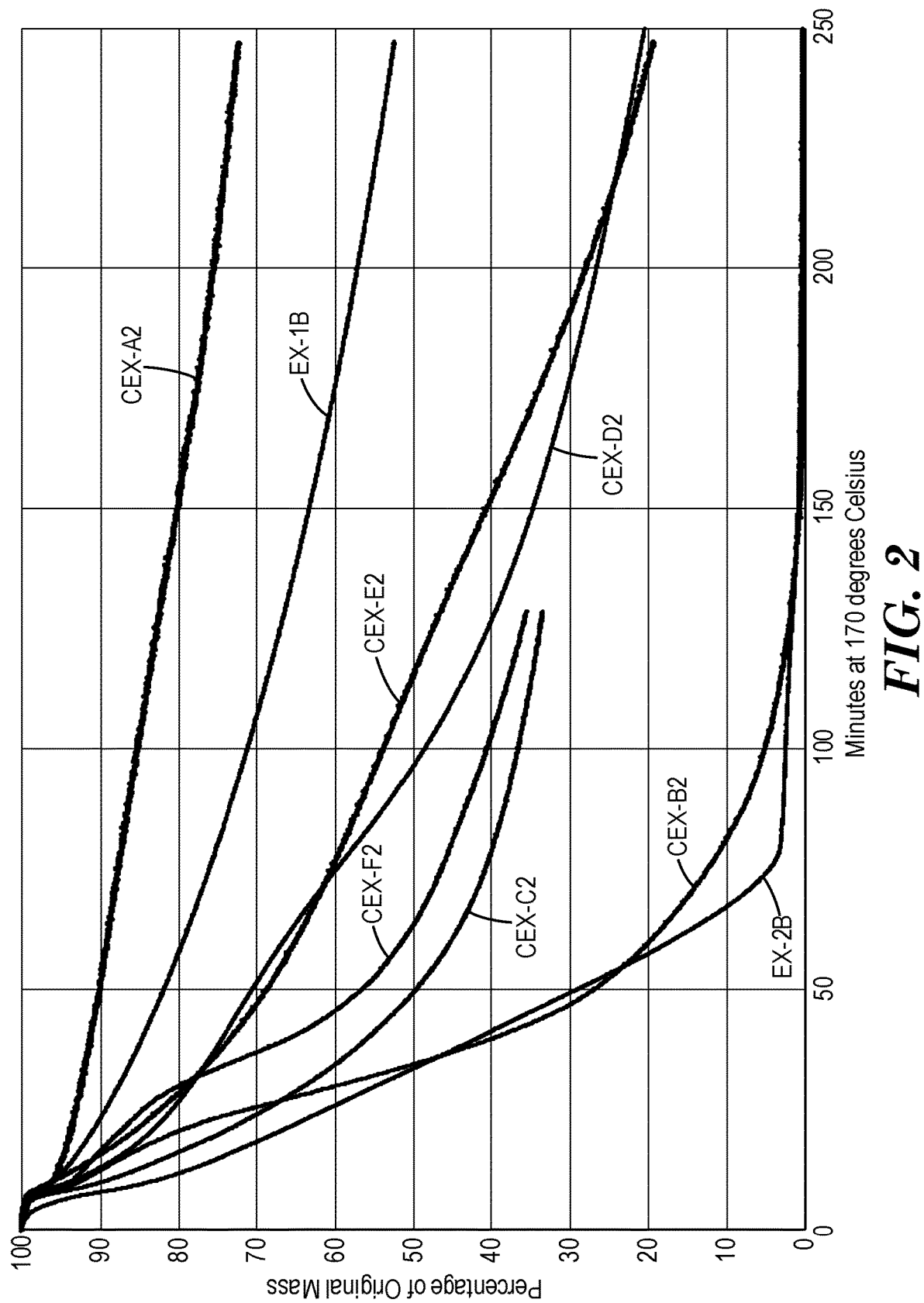
FIG. 2 is a plot of weight in percent vs. minutes at elevated temperature (170° C.) during Thermal Gravimetric Analysis (TGA) for Comparative Examples CEX-A2 through CEX-F2 and Examples EX-1B to EX-2B.

A 2.61 mg sample of the film was heated in a temperature ramp mode at 20° C./min to 170° C. in TA-Instruments Q500 TGA thermal gravimetric analyzer and isothermally held at that temperature for 4 hours. The resulting mass loss versus temperature trace (CEX-A2) is depicted in FIG. 2.

Comparative Example B

To a 0.5 g aliquot of distilled CA-1 from Preparative Example 1 were added 5 drops of base solution prepared in Preparative Example 3. Exothermic polymerization followed.

A 3.10 mg sample of a film prepared according to the above procedure was heated in a temperature ramp mode at 10° C./min to 300° C. in TA-Instruments Q500 TGA. The resulting mass loss versus temperature trace (CEX-B1) is reported in FIG. 1.

A 2.40 mg sample of the film was heated in a temperature ramp mode at 20° C./min to 170° C. in TA-Instruments Q500 TGA thermal gravimetric analyzer and isothermally held at that temperature for 4 hours. The resulting mass loss versus temperature trace (CEX-B2) is depicted in FIG. 2.

Comparative Example C

To a 0.5 g aliquot of distilled CA-2 from Preparative Example 2 were added 1 drop of base solution prepared in Preparative Example 3. Exothermic polymerization followed.

A 5.45 mg sample of film prepared in generally according to the above procedure was heated in a temperature ramp mode at 10° C./min to 300° C. in TA-Instruments Q500 TGA thermal gravimetric analyzer. The resulting mass loss versus temperature trace (CEX-C1) is reported in FIG. 1.

A 9.70 mg sample of the film prepared according to CEX-C was heated in a temperature ramp mode at 20° C./min to 170° C. in TA-Instruments Q500 TGA and isothermally held at that temperature for 4 hours. The resulting mass loss versus temperature trace (CEX-C2) is depicted in FIG. 2.

Comparative Example D

To a 0.5 g aliquot of distilled CA-2 from Preparative Example 2 were added 5 drops of base solution prepared in Preparative Example 3. Exothermic polymerization followed.

A 3.48 mg sample of film prepared according to the above procedure was heated in a temperature ramp mode at 10° C./min to 300° C. in TA-Instruments Q500 TGA thermal gravimetric analyzer. The resulting mass loss versus temperature trace (CEX-D1) is depicted in FIG. 1.

A 6.77 mg sample of the film was heated in a temperature ramp mode at 20° C./min to 170° C. in TA-Instruments Q500 TGA thermal gravimetric analyzer and isothermally held at that temperature for 4 hours. The resulting mass loss versus temperature trace (CEX-D2) is depicted in FIG. 2.

Comparative Example E

PI1 (0.02 g) was dissolved in a 0.5 g aliquot of distilled CA-1 from Preparative Example 1. The solution thus obtained was coated between two release coated sheets of PET to approximately 10 mil thickness. The construction was then placed under GE F15T8-BL bulbs at a distance of 2 cm for 5 minutes to produce clear, colorless polymeric film.

A 7.44 mg sample of the film was heated in a temperature ramp mode at 10° C./min to 300° C. in a TA-Instruments Q500 TGA thermal gravimetric analyzer. The resulting mass loss versus temperature trace (CEX-E1) is reported in FIG. 1.

A 1.92 mg sample of the film was heated in a temperature ramp mode at 20° C./min to 170° C. in TA-Instruments Q500 TGA thermal gravimetric analyzer and isothermally held at that temperature for 4 hours. The resulting mass loss versus temperature trace (CEX-E2) is depicted in FIG. 2.

Comparative Example F

PI1 (0.02 g) was dissolved in a 0.5 g aliquot of distilled CA-2 from Preparative Example 2. The solution thus obtained was coated between two release coated sheets of PET to approximately 10 mil thickness. The construction was then placed under GE F15T8-BL bulbs at a distance of 2 cm for 5 minutes to produce clear, colorless polymeric film.

A 6.88 mg sample of the film was heated in a temperature ramp mode at 10° C./min to 300° C. in TA-Instruments Q500 TGA thermal gravimetric analyzer. The resulting mass loss versus temperature trace (CEX-F1) is reported in FIG. 1.

A 7.13 mg sample of the film was heated in a temperature ramp mode at 20° C./min to 170° C. in TA-Instruments Q500 TGA thermal gravimetric analyzer and isothermally held at that temperature for 4 hours. The resulting mass loss versus temperature trace (CEX-F2) is depicted in FIG. 2.

Example 1

PI1 (0.02 g) was dissolved in a 0.5 g aliquot of distilled CA-1 from Preparative Example 1 containing 0.03 g of YL-152-2 (starch coated AM-2). The sample thus obtained was coated between two release coated sheets of PET to approximately 10 mil thickness. The construction was then placed under GE F15T8-BL bulbs at a distance of 2 cm for 5 minutes to produce clear, colorless polymeric film.

A 1.62 mg sample of the film was heated in a temperature ramp mode at 10° C./min to 300° C. in TA-Instruments Q500 TGA thermal gravimetric analyzer. The resulting mass loss versus temperature trace (EX-1A) is reported in FIG. 1.

A 3.19 mg sample of the film prepared according to EX-1 was heated in a temperature ramp mode at 20° C./min to 170° C. in TA-Instruments Q500 TGA thermal gravimetric analyzer, and isothermally held at that temperature for 4 hours. The resulting mass loss versus temperature trace (EX-1B) is depicted in FIG. 2.

Example 2

PI1 (0.02 g) was dissolved in a 0.5 g aliquot of distilled CA-1 from Preparative Example 2 containing 0.03 g of YL-152-2 (starch coated AM-2). The sample thus obtained was coated between two release coated sheets of PET to approximately 10 mil thickness. The construction was then placed under GE F15T8-BL bulbs at a distance of 2 cm for 5 minutes to produce clear, colorless polymeric film.

A 3.68 mg sample of the film prepared according to Preparative Example 11 was heated in a temperature ramp mode at 10° C./min to 300° C. in TA-Instruments Q500 TGA thermal gravimetric analyzer. The resulting mass loss versus temperature trace (EX-2A) is reported in FIG. 1.

A 4.04 mg sample of the film was heated in a temperature ramp mode at 20° C./min to 170° C. in TA-Instruments Q500 TGA thermal gravimetric analyzer and isothermally held at that temperature for 4 hours. The resulting mass loss versus temperature trace (EX-2B) is depicted in FIG. 2.

Referring now to FIG. 1, samples CEX-A to CEX-F experienced complete mass loss after a thermal ramp to 300° C.: there was no evidence of char or any material remnant in the TGA pans. 100% mass loss is further confirmed by the TGA traces. In samples EX-1 and EX-2, the residual mass approximates the anticipated residual mass of starch encapsulating the amine.

Notably, the onset of mass loss tracks with the amount of base present.

Samples without any amine (CEX-E and CEX-F) experienced 10% mass loss at about 220° C. For the samples (EX-1 and EX-2) with the next lowest base concentration that temperature is 10 degrees lower. The samples with the highest base concentration (CEX-B and CEX-D) lost 10% of their mass before temperature of 200° C. was attained. Similarly, these highest base concentration samples are completely volatilized below 240° C. That temperature goes up above 260° C. as the base amount is reduced 5-fold (CEX-A and CEX-C).

However, when a modest amount (3% wt) of protected amine is added to those free radically photopolymerized samples (CEX-E and CEX-F vs. EX-1 and EX-2), a 40° C. lower temperature shift is observed for the 10% mass loss Similar downward shift is observed throughout the entire temperature ramp. Another notable outcome of adding starch-coated base is that the corresponding mass loss curves now asymptote between 3 and 10% residual mass, the amount that tracks fairly well with the anticipated amount of starch present in those samples.

Isothermal TGA holds further highlighted the difference in thermal decomposition of cyanoacrylates as a function of base concentration. Thus, the compositions of CEX-B2 and CEX-D2, containing the highest amounts of base, are completely decomposed by 130 minutes and 80 minutes at 170° C., respectively. At the same time, the compositions of CEX-E2 and CEX-F2, containing no added base, retain over 50% of their initial mass even after 250 minutes at the same temperature. The decomposition of other compositions with base concentrations between those two extremes fall accordingly between those two sets of examples.

Cyanoacrylate UV 3D-Printing Procedures a) Some cure depth measurements were performed by curing a small sample of material on a prepared substrate using an Asiga Pico 2HD 27 3D printer (Asiga, Sydney, Australia), which had a 385 nm LED DLP light source with a nominal intensity of 24 mW/cm$^2$. Circles (5 mm diameter) were polymerized using various exposure times. Excess uncured material was gently wiped off, and the thickness of the polymerized sample was measured with a Mitutoyo depth gauge. The Asiga Pico 2HD 27 was a small desktop inverted vat polymerization printer with a 27-micron pixel size and a clear film based vat with a sliding mechanism for layer thickness control. For cure depth sample fabrication however, no vat was used.

b) Other cure depth measurements were performed using the same technique on an Admatec Admaflex 130 3D Printer (Admatec, Alkmaar, Netherlands), which had a 405 nm LED DLP light source with a nominal intensity of 40 mW/cm$^2$ and 50-micron pixels. 3M Company logos roughly 1 cm×2 cm were polymerized at various exposure times. The Admaflex 130 was a floor-standing inverted vat polymerization printer with a conveyed film holding fresh material rather than a fixed vat. For cure depth sample fabrication, the moving film was not used.

Examples 3-4 and Comparative Example G

Preparative Example PE-A

A 250-mL round bottom flask with a magnetic stir bar was loaded with 5.13 g MLQ (20.1 mmol) and 8.37 g of 2-phenyl-2-propanol (60.2 mmol). The flask was sealed with a septum and a nitrogen purge was introduced through 16 gauge needle inlet and vent. The mixture was stirred for 5 minutes before adding 0.13 g of tin(II) 2-ethylhexanoate (0.28 mmol). After 18 hours the reaction was taken up in a minimum of hot solvent (dichloromethane-hexane 2:1 by volume) and cooled to 8'"C resulting in a colorless fine crystalline solid that was recovered via vacuum filtration. Isolated yield 5.75 g, 54.8% of theoretical.

Part A of a two-part curable composition was prepared by dissolving 0.2 g of PI2 in 10 grams of freshly distilled ethyl cyanoacrylate (CA-1) stabilized with 0.2 g of acetic anhydride.

Part B of the curable composition was prepared by dissolving 0.2 g of PI2 and 0.5 g of PE-A in 10 grams of TMPTA.

Comparative Example G

Figure 3:
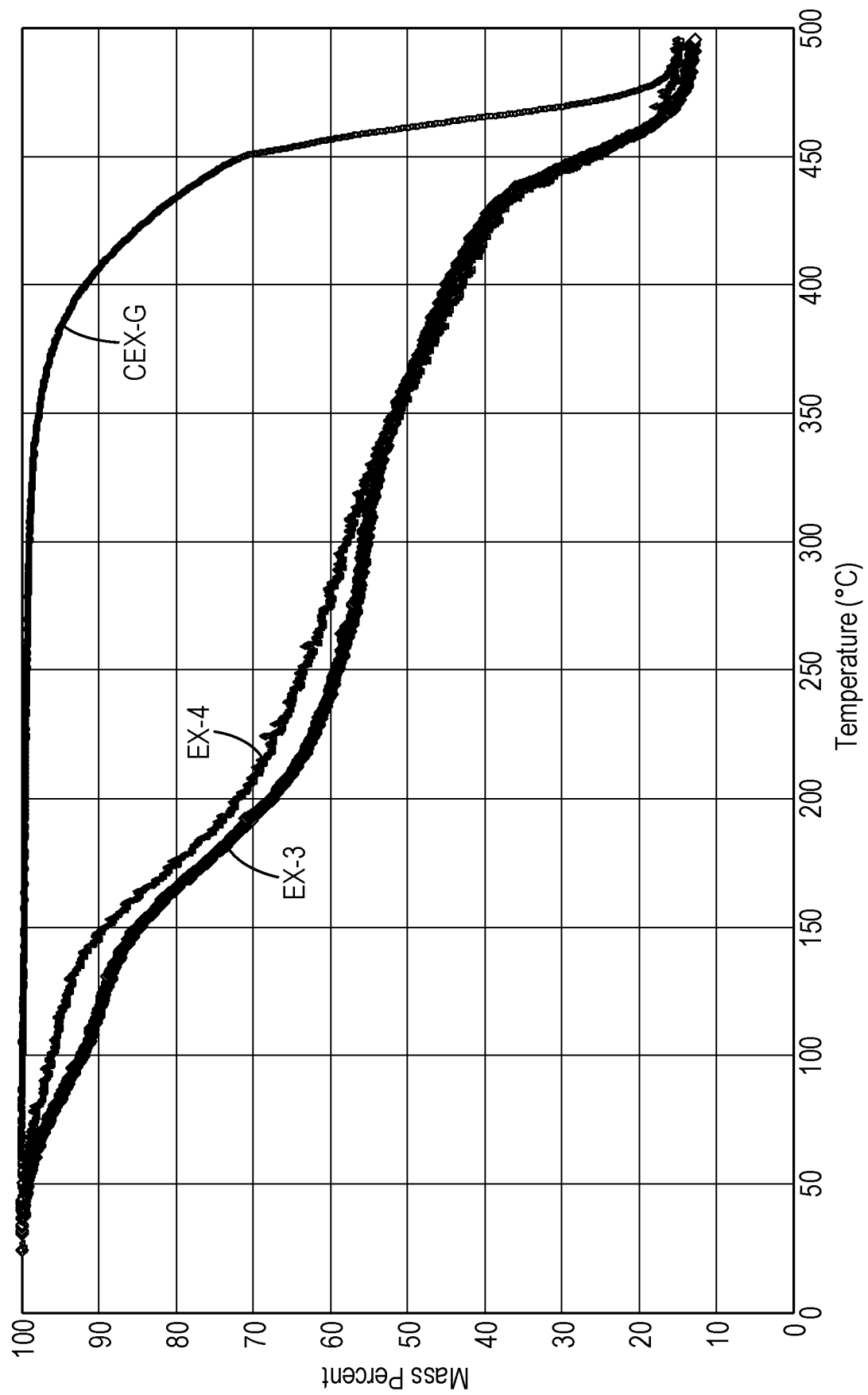
FIG. 3 is a plot of mas percent vs. Temperature for Example EX-3 and EX-4 and Comparative Example CEX-G.

A polymer of Part B was prepared by irradiating 1 gram of Part B solution under Sylvania 350 Blacklight F15T8/350BL bulbs for 5 minutes. An aliquot of that polymer was heated in a Thermogravimetric Analysis experiment at 10° C./min to 400° C. Results (black curve) are reported in FIG. 3.

Example 3

Part A (1 gram) was added to 1 gram of Part B and mixed thoroughly. Cure depth measurement was performed by curing a small sample of material on a prepared substrate using Asiga Pico 2HD 27 3D printer, which has a 385 nm LED DLP and a rough intensity of 24 mW/cm$^2$. 5 mm diameter circles were polymerized using 30 second exposure. The substrate consisted of a glass slide covered with a slightly smaller piece of uncoated PET film. Onto this a rectangular dam of PSA-backed silicone was placed to create a well to contain uncured resin material. A few drops of resin were placed onto the middle of the prepared substrate using a standard 3 mL pipette and the construction was placed into the UV-SLA printer. A timer built into the system was used to control the duration of light exposure, while the projector was either controlled to emit a specified region of light (5 mm diameter circle in this case) or simply turned fully on. Once the cure duration was finished, excess uncured liquid resin was removed by softly dabbing with a cleanroom-grade wipe. In some instances, the cured thickness was measured using a Mitutoyo thickness gauge. An aliquot of the sample was heated in a Thermogravimetric Analysis experiment at 10° C./min to 400° C. The results are reported in FIG. 3. A different aliquot of this solution was used to print a 3M logo using a 3M logo mask was polymerized using 30 second exposure.

Example 4

Part A (0.67 g) was added to 0.33 gram of Part B and mixed thoroughly. Cure depth measurement was performed by curing a small sample of material on a prepared substrate using Asiga Pico 2HD 27 3D printer, which has a 385 nm LED DLP and a nominal intensity of 24 mW/cm$^2$. 5 mm diameter circles were polymerized using 30 second exposure. The substrate consisted of a glass slide covered with a slightly smaller piece of uncoated PET film. Onto this a rectangular dam of PSA-backed silicone was placed to create a well to contain uncured resin material. A few drops of resin were placed onto the middle of the prepared substrate using a standard 3 mL pipette and the construction was placed into the UV-SLA printer. A timer built into the system was used to control the duration of light exposure, while the projector was either controlled to emit a specified region of light (5 mm diameter circle in this case) or simply turned fully on. Once the cure duration was finished, excess uncured liquid resin was removed by softly dabbing with a cleanroom-grade wipe. In some instances, the cured thickness was measured using a Mitutoyo thickness gauge. An aliquot of the sample was heated in a Thermogravimetric Analysis experiment at 10° C./min to 400 C. The results are reported in FIG. 3.

The preceding description, given in order to enable one of ordinary skill in the art to practice the claimed disclosure, is not to be construed as limiting the scope of the disclosure, which is defined by the claims and all equivalents thereto.

What is claimed is:

1. A method comprising:
   making a shaped model comprising a cyanoacrylate polymer;
   preparing an investment that has a cavity corresponding to the shaped model; and
   heating the shaped model to sufficient temperature that the cyanoacrylate polymer depolymerizes and volatilizes, wherein the shaped model is formed by an additive manufacturing process comprising successively curing superposed layers of a curable composition comprising: a cyanoacrylate monomer, a free-radical initiator, and a protected amine, and wherein the curable composition is free of unprotected amine.

2. The method of claim 1, wherein the additive manufacturing process comprises a stereolithographic process, and wherein the free-radical initiator comprises a free-radical photoinitiator.

* * * * *